United States Patent
Chen et al.

(10) Patent No.: US 9,612,684 B2
(45) Date of Patent: Apr. 4, 2017

(54) CAPACITANCE DETECTING CIRCUIT

(71) Applicant: BYD Company Limited, Shenzhen (CN)

(72) Inventors: Shengsheng Chen, Shenzhen (CN); Jie Zhang, Shenzhen (CN); Yun Yang, Shenzhen (CN)

(73) Assignee: BYD Company Limited (CN)

( * ) Notice: Subject to any disclaimer, the term of this patent is extended or adjusted under 35 U.S.C. 154(b) by 8 days.

(21) Appl. No.: 14/653,497

(22) PCT Filed: Dec. 30, 2013

(86) PCT No.: PCT/CN2013/090888
§ 371 (c)(1),
(2) Date: Jun. 18, 2015

(87) PCT Pub. No.: WO2014/101869
PCT Pub. Date: Jul. 3, 2014

(65) Prior Publication Data
US 2015/0317033 A1    Nov. 5, 2015

(30) Foreign Application Priority Data

Dec. 30, 2012  (CN) .......................... 2012 1 0585884

(51) Int. Cl.
*G06F 3/041*    (2006.01)
*G06F 3/047*    (2006.01)
(Continued)

(52) U.S. Cl.
CPC ............ *G06F 3/0418* (2013.01); *G06F 3/044* (2013.01); *G06F 3/047* (2013.01); *G06F 3/0416* (2013.01);
(Continued)

(58) Field of Classification Search
None
See application file for complete search history.

(56) References Cited

U.S. PATENT DOCUMENTS

2006/0055416 A1    3/2006  Kinoshita et al.
2007/0247172 A1    10/2007 Li
(Continued)

FOREIGN PATENT DOCUMENTS

CN    101060321 A    10/2007
CN    101273274    9/2008
(Continued)

*Primary Examiner* — Seokyun Moon
(74) *Attorney, Agent, or Firm* — DLA Piper LLP (US)

(57) ABSTRACT

A capacitance detecting circuit includes induction units; a transferring capacitor configured to transfer charges to a capacitor of a scanned induction unit; a charging module that charges the transferring capacitor, wherein a first terminal of the charging module connects to the first terminal of the transferring capacitor, and a second terminal of the charging module connects to a first power supply; a discharging module that discharges the transferring capacitor and including a first resistor and a second switch; and a controller connected to the charging module, the transferring capacitor and the discharging module, and configured to control the second switch to switch on when a voltage of the transferring capacitor is larger than a preset threshold voltage, and to update a count value and detect a touch on the induction units according to the count value.

19 Claims, 4 Drawing Sheets

(51) Int. Cl.
*G09G 5/00* (2006.01)
*G06F 3/044* (2006.01)

(52) U.S. Cl.
CPC ..... *G09G 5/003* (2013.01); *G09G 2300/0426* (2013.01)

(56) References Cited

U.S. PATENT DOCUMENTS

| | | | |
|---|---|---|---|
| 2009/0115737 A1* | 5/2009 | Toyoshima | G06F 3/044 345/173 |
| 2011/0163768 A1 | 7/2011 | Kwon et al. | |
| 2011/0279131 A1 | 11/2011 | Kim et al. | |
| 2013/0120309 A1 | 5/2013 | Mo | |

FOREIGN PATENT DOCUMENTS

| | | |
|---|---|---|
| CN | 101430436 A | 5/2009 |
| CN | 101943716 | 1/2011 |
| CN | 203084695 U | 7/2013 |
| JP | 2011100186 A * | 5/2011 |
| WO | 2011/138529 | 11/2011 |

* cited by examiner

CAPACITANCE DETECTING CIRCUIT

CROSS-REFERENCE TO RELATED APPLICATION

This application claims priority to, and benefits of Chinese Patent Application Serial No. 201210585884.2, filed with the State Intellectual Property Office of P. R. C. on Dec. 30, 2012, the entire contents of which are incorporated herein by reference.

TECHNICAL FIELD

This disclosure generally relates to the circuit design field, more particularly to a capacitance detecting circuit.

BACKGROUND

Presently, a touch screen with the advantages of easy and convenient operation and humanization is widely used in various kinds of electronic products such as a mobile phone, a PDA (personal digital assistant), a GPS (global position system), a PMP (MP3, MP4, etc.), a tablet personal computer and the like.

Conventionally, an induction unit in the touch screen is judged whether to be touched or not by detecting a self-capacitance thereof. Thus, it becomes more important to accurately detect the self-capacitance generated by the induction unit in the touch screen when the induction unit is touched.

However, a conventional method of detecting capacitance has the disadvantage of low detection accuracy. When detecting the capacitance generated by touching the induction unit, an error occurs because of the existence of mutual-capacitance, thereby decreasing detection accuracy. Therefore, it is difficult to correctly judge whether the induction unit is touched or not.

SUMMARY

We provide a capacitance detecting circuit. The capacitance detecting circuit may comprise: N induction units, where N is an integer larger than or equal to 1; a transferring capacitor configured to transfer charges to a capacitor of a scanned induction unit among the N induction units, wherein a first terminal of the transferring capacitor connects to the N induction units, respectively, and a second terminal of the transferring capacitor is grounded; a charging module configured to charge the transferring capacitor, wherein a first terminal of the charging module connects to the first terminal of the transferring capacitor, and a second terminal of the charging module connects to a first power supply; a discharging module configured to discharge the transferring capacitor and comprising a first resistor and a second switch, wherein a first terminal of the discharging module connects to the first terminal of the charging module and the first terminal of the transferring capacitor, respectively, a second terminal of the discharging module is grounded; a controller connected with the charging module, the transferring capacitor and the discharging module, respectively, and configured to control the second switch to switch on when a voltage of the transferring capacitor is larger than a preset threshold voltage, to update a count value and detect a touch on the N induction units according to the count value.

With the capacitance detecting circuit, when detecting the capacitance generated by touching the induction unit, influences from mutual-capacitance may be eliminated or reduced, thereby improving detection accuracy. Thus, the induction unit can be judged correctly whether to be touched or not.

Additional aspects and advantages of selected, representative examples in the disclosure will be given in part in the following descriptions, become apparent in part from the following descriptions, or be learned from the practice of those examples.

BRIEF DESCRIPTION OF THE DRAWINGS

These and other aspects and advantages of the disclosure will become apparent and more readily appreciated from the following descriptions made with reference to the drawings.

DETAILED DESCRIPTION

Figure 1:
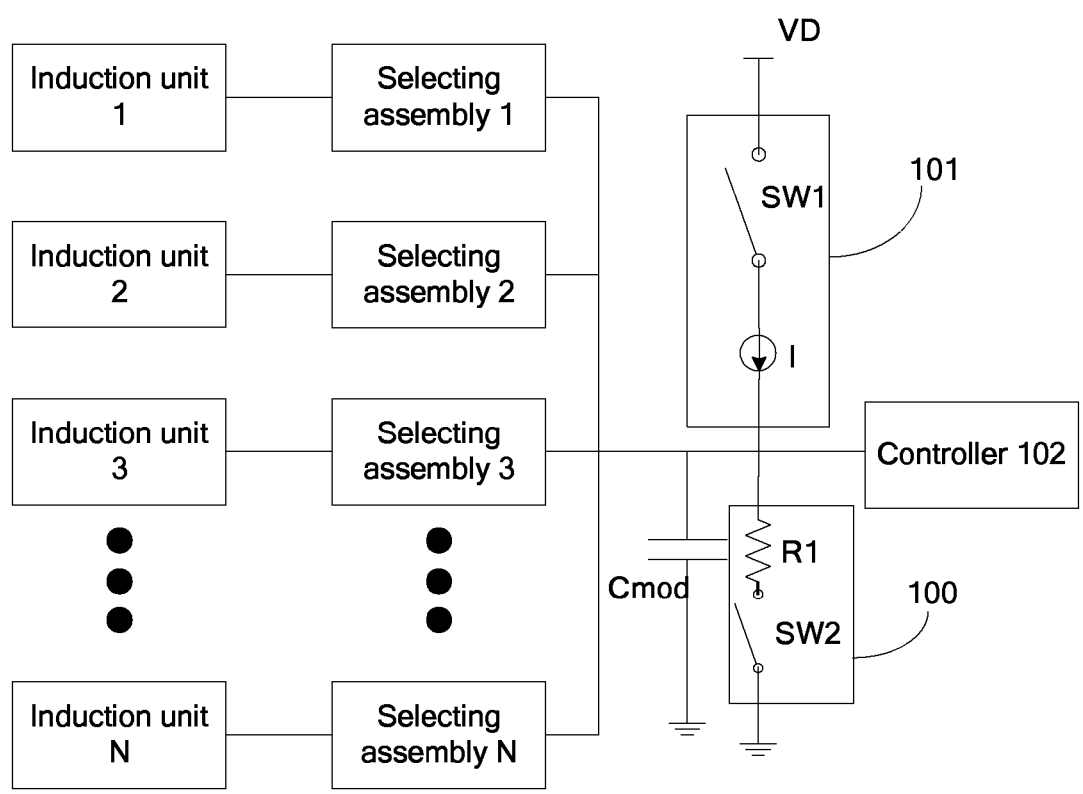
FIG. 1 is a schematic diagram of a capacitance detecting circuit according to an example.

Reference will be made in detail to examples of our methods and circuits. The examples described herein with reference to the drawings are explanatory, illustrative, and used to generally understand the disclosure. The examples shall not be construed to limit the disclosure. The same or similar elements and the elements having same or similar functions are denoted by like reference numerals throughout the descriptions.

In the description, terms concerning attachments, coupling and the like such as "connect," "connects," "connected," "interconnect," "interconnects" and "interconnected," refer to a relationship in which structures are secured or attached to one another through mechanical or electrical connection, or directly or indirectly through intervening structures, unless expressly described otherwise.

In addition, terms such as "first" and "second" are used herein for purposes of description and are not intended to indicate or imply relative importance, significance or order.

As shown in FIG. 1, according to an example, a capacitance detecting circuit is provided. The capacitance detecting circuit comprises N induction units (1, 2, 3 . . . N), a transferring capacitor Cmod, a charging module 101, a controller 102 and a discharging module 100.

When each induction unit is touched, the capacitance thereof is changed. N is an integer larger than or equal to 1. In one example, the capacitance detecting circuit may detect a plurality of induction units simultaneously.

As shown in FIG. 1, the transferring capacitor Cmod is configured to transfer its charges to a self-capacitor of a scanned induction unit among the N induction units (1, 2, 3 . . . N). A first terminal of the transferring capacitor connects to first terminals of the N induction units, respectively, a second terminal of the transferring capacitor is grounded, and second terminals of the N induction units are commonly grounded. In general, when the induction unit is touched, the capacitance thereof may be increased. For example, when it is scanned that induction units 1, 2, 3 among the N induction units are touched, a self-capacitance of each of the scanned induction units 1, 2, 3 is changed (for example, increased), and the transferring capacitor Cmod transfers its charges to the self-capacitor of each of the scanned induction units 1, 2, 3, respectively, to pull down a voltage of the transferring capacitor Cmod.

The charging module 101 is configured to charge the transferring capacitor Cmod. A first terminal of the charging module 101 connects to the first terminal of the transferring capacitor Cmod, and a second terminal of the charging module 101 connects to a first power supply VD. The charging module 101 comprises a first switch SW1 and a current source I connected in series.

The discharging module 100 is configured to discharge the transferring capacitor Cmod and comprises a first resistor R1 and a second switch SW2. A first terminal of the discharging module 100 connects to the first terminal of the charging module 101 and the first terminal of the transferring capacitor Cmod respectively, and a second terminal of the discharging module 100 is grounded.

A controller 102 connects to the charging module 101, the transferring capacitor Cmod and the discharging module 100, respectively. The controller 102 is configured to control the second switch SW2 to switch off when a voltage of the transferring capacitor Cmod is larger than a preset threshold voltage Vth, to update a count value and detect a touch on the N induction units according to the count value. That is to say, the controller 102 controls the second switch SW2 to switch on when the voltage of the transferring capacitor Cmod is larger than the preset threshold voltage Vth; controls the second switch SW2 to switch off when the voltage of the transferring capacitor Cmod is smaller than the preset threshold voltage Vth; and updates a count value according to the touch on the induction unit to detect the touch on the N induction units.

Specifically, the controller 102 controls the first switch SW1 to switch on to make the charging module 101 charge the transferring capacitor Cmod. The controller 102 controls the second switch SW2 to switch on when the voltage of the transferring capacitor Cmod is larger than the preset threshold voltage Vth. The controller 102 controls the second switch SW2 to switch off when the voltage of the transferring capacitor Cmod is smaller than the preset threshold voltage Vth. The voltage of the transferring capacitor Cmod is pulled down when the charges of the transferring capacitor Cmod are transferred to a scanned induction unit. The larger the capacitance of the scanned induction unit is, the lower the voltage of the transferring capacitor Cmod is so that the smaller the count value of a counter is, that is to say, the count value of the touched induction unit is smaller than that of a non-touched induction unit, thus detecting the touch on the N induction units according to the count value.

In one example as shown in FIG. 1, the capacitance detecting circuit further comprises N selecting assemblies (1, 2, 3 ... N) in which each selecting assembly corresponds to one induction unit and connects between the one induction unit and the transferring capacitor Cmod. Each selecting assembly controls to connect or disconnect a corresponding induction unit with the transferring capacitor Cmod.

In one example, the each selecting assembly comprises a third switch SW3 and a fourth switch SW4. The third switch SW3 connects between the corresponding induction unit and the transferring capacitor Cmod. A first terminal of the fourth switch SW4 connects to the corresponding induction unit and a second terminal of the fourth switch SW4 is grounded. The third switch SW3 and the fourth switch SW4 are switched on alternately.

Figure 2:
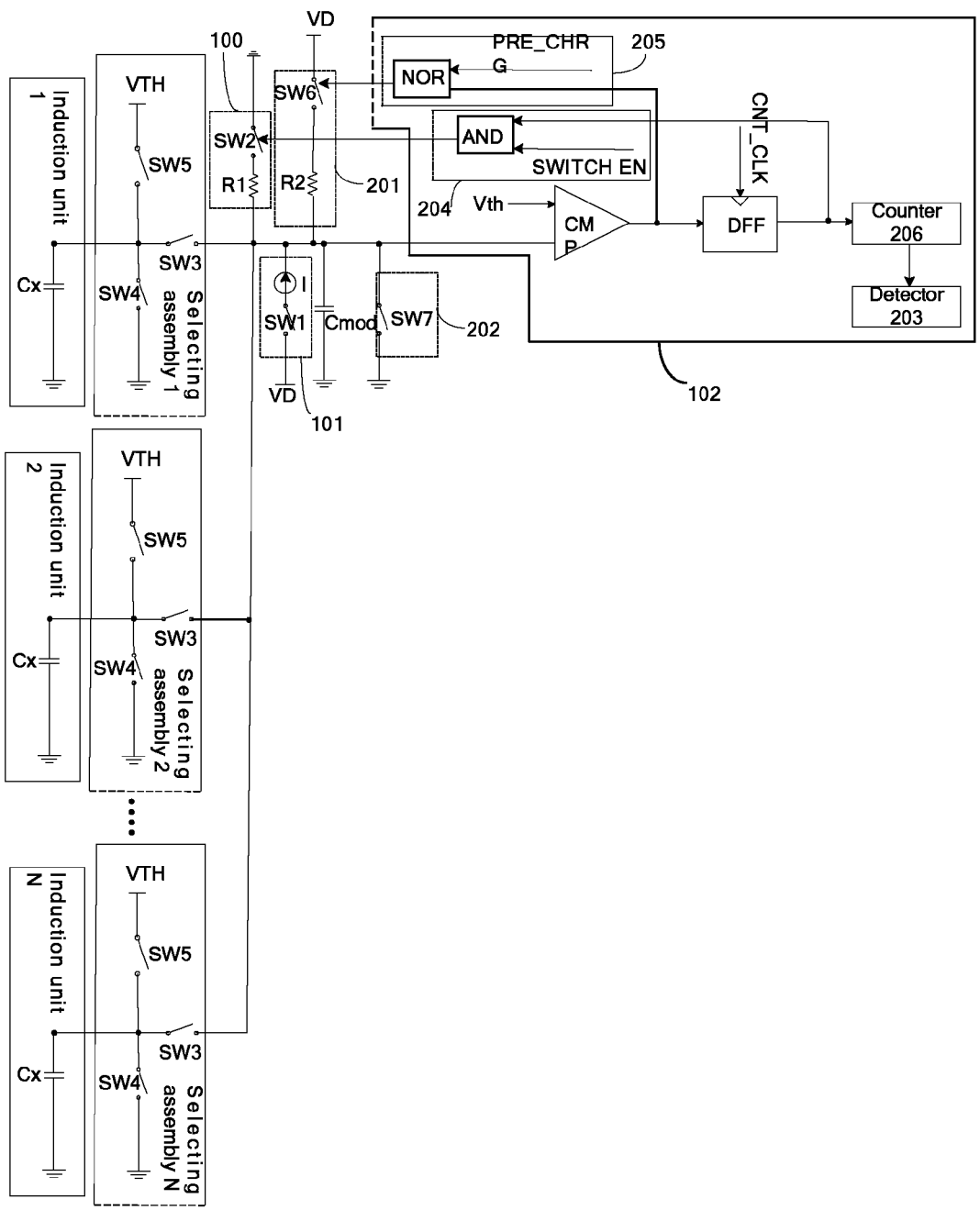
FIG. 2 is a schematic circuit diagram of the capacitance detecting circuit according to an example.

Moreover, as shown in FIG. 2, the each selecting assembly comprises a fifth switch SW5, a first terminal of the fifth switch SW5 connects to the corresponding induction unit, a second terminal of the fifth switch SW5 connects to a second power supply VTH, and a voltage of the second power supply VTH is the preset threshold voltage Vth. Of course, in another example, the voltage of the second power supply VTH may be other values.

Further, in one example as shown in FIG. 2, the capacitance detecting circuit further comprises a pre-charging module 201 configured to pre-charge the transferring capacitor Cmod. A first terminal of the pre-charging module 201 connects to the first terminal of the transferring capacitor Cmod, and a second terminal of the pre-charging module 201 connects to the first power supply VD. The pre-charging module 201 comprises a sixth switch SW6 and a second resistor R2 connected in series. That is to say, the pre-charging module 201 pre-charges the transferring capacitor Cmod until the voltage of the transferring capacitor Cmod closely reaches the preset threshold Vth before charging the transferring capacitor Cmod.

Also as shown in FIG. 2, the capacitance detecting circuit further comprises a pre-discharging module 202 configured to pre-discharge the transferring capacitor Cmod before the pre-charging module pre-charges the transferring capacitor. A first terminal of the pre-discharging module 202 connects to the first terminal of the transferring capacitor Cmod, and a second terminal of the pre-discharging module 202 is grounded. The pre-discharging module 202 comprises a seventh switch SW7 and the pre-discharging module 202 pre-discharges the transferring capacitor Cmod by grounding a first terminal of the seventh switch SW7. In the example, pre-charging and pre-discharging the transferring capacitor Cmod helps ensure that states of the transferring capacitor Cmod are the same for each detection, thus increasing the detection accuracy.

In one example as shown in FIG. 2, the controller comprises: a comparator CMP, a trigger DFF, a counter 206, a detector 203 and a first selector 204. A first input terminal of the comparator CMP is applied with the preset threshold voltage Vth and a second input terminal of the comparator CMP connects to the first terminal of the transferring capacitor Cmod. An input terminal of the trigger DFF connects to an output terminal of the comparator CMP that generates a triggering signal according to a comparison result from the comparator CMP. The trigger DFF further comprises a clock signal CNT_CLK input. An input terminal of the counter 206 connects to an output terminal of the trigger DFF that counts according to the triggering signal. The detector 203 connects to the counter 206 and is configured to detect the touch on the N induction units according to the count value of the counter 206. An input terminal of the first selector 204 connects to the output terminal of the trigger DFF that generates a first control signal according to the triggering signal. The first control signal is configured to control the discharging module 100 to discharge to the transferring capacitor Cmod.

In addition, the controller 102 further comprises a second selector 205. An input terminal of the second selector 205 connects to the output terminal of the comparator CMP that generates a second control signal according to the comparison result. The second control signal is configured to control the pre-charging module 201 to pre-charge the transferring capacitor Cmod.

Specifically, as shown in FIG. 2, the first selector 204 is an AND gate, a first input terminal of the AND gate connects to the output terminal of the trigger DFF, and a second input terminal of the AND gate is applied with a switch enable signal SWITCH EN. During the pre-charging and pre-discharging, the switch enable signal SWITCH EN is low to control the second switch SW2 of the discharging module 100 to switch off. During the detection after pre-charging, the switch enable signal SWITCH EN is high, and a signal from an output terminal of the AND gate controls the second switch SW2 of the discharging module 100 to switch on or switch off. The switch enable signal SWITCH EN returns to a lower position after detection is completed. The second selector 205 is a NOR gate, a first input terminal of the NOR gate connects to the output terminal of the comparator CMP, and a second input terminal of the NOR gate is applied with a pre-charging signal PRE_CHRG.

Figure 3:
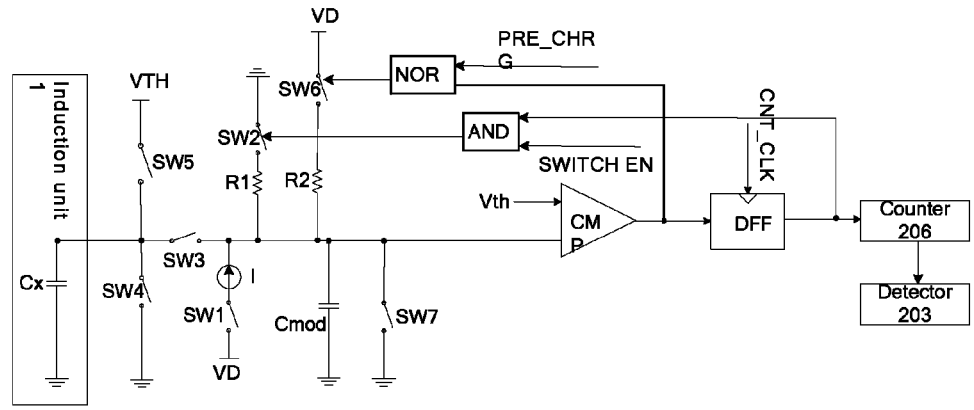
FIG. 3 is a schematic circuit diagram of the capacitance detecting circuit according to an example.

In an example, when there is only one induction unit in the capacitance detecting circuit, as shown in FIG. 3, a capacitance detection process can be described as follows.

The seventh switch SW7 is switched on to pre-discharge the transferring capacitor Cmod. Second, the seventh switch SW7 is switched off and the sixth switch SW6 is switched on so that the first power supply VD pre-charges the transferring capacitor Cmod by the second resistance R2 until the voltage of the transferring capacitor Cmod closely reaches the preset threshold voltage Vth. The first switch SW1 keeps off during the pre-discharging and the pre-charging. The sixth switch SW6 and the seventh switch SW7 are switched off after the pre-charging is completed. At this time, the first switch SW1 is controlled to switch on so that the first power supply VD pre-charges the transferring capacitor Cmod via a current source I. When the voltage of the transferring capacitor Cmod is larger than a reference voltage of the comparator CMP (i.e., the preset threshold voltage Vth), the trigger DFF controls the second switch SW2 to switch on according to the result output from the comparator CMP so that the transferring capacitor Cmod is discharged via the first resistance R1. When the voltage of the transferring capacitor Cmod is smaller than the preset threshold voltage Vth, an output of the comparator CMP is turned over and the trigger DFF controls the second switch SW2 to switch off according to the output result from the comparator CMP. During a charge transferring process of the transferring capacitor Cmod, the charges of the transferring capacitor Cmod are transferred to a capacitor Cx of the induction unit via the third switch SW3. When the third switch SW3 is switched off, the voltage of the transferring capacitor Cmod is pulled down to be smaller than the preset threshold voltage Vth, which enables the output of the comparator CMP to be turned over to switch off the second switch SW2. At this time, the transferring capacitor Cmod is charged via the current source I until the voltage thereof is larger than the preset threshold voltage Vth, which enables the output of the comparator CMP to be turned over to switch on the second switch SW2. The third switch SW3 and the fourth switch SW4 are controlled by a two-phase non-overlapped clock signal (that is, when the third switch SW3 is controlled to switch on, the fourth switch SW4 is controlled to switch off; and when the third switch SW3 is controlled to switch off, the fourth switch SW4 is controlled to switch on), the charges on the capacitor Cx transferred from the transferring capacitor Cmod are discharged to the ground by the fourth switch SW4. The fifth switch is a synchronous switch. The fifth switch SW5 is kept off when the induction unit is being scanned.

The capacitance of the capacitor Cx, the duty ratio of a rectangular wave output from the trigger DFF and the count value of the counter 206 when the induction unit is touched are different from those when the induction unit is not touched. When detection is finished, the above-mentioned processes are repeated.

Therefore, the detector 203 may judge whether the induction unit is touched according to the count value of the counter. For example, it is assumed that when the induction unit is not touched, the count value of the counter is 1000; and when the induction unit is touched, the count value of the counter is 500. Thus, it may judge whether the induction unit is touched or not according to the count value of the counter.

Figure 4:
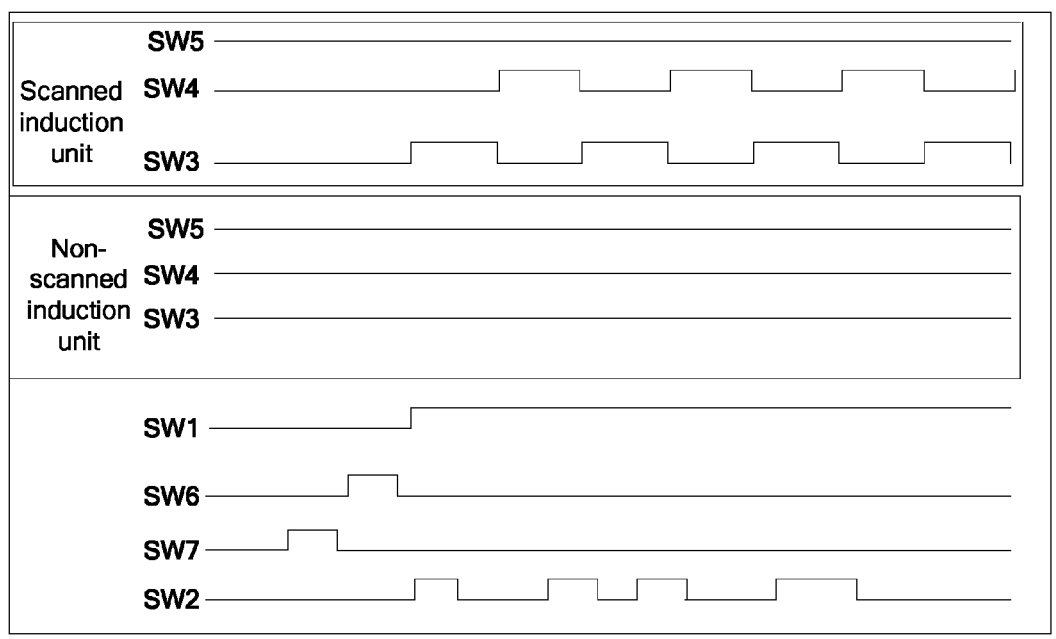
FIG. 4 is a wave chart of switch controlling signals of the capacitance detecting circuit according to an example.

In one example, a wave chart of switch controlling signals under a non-fullscreen synchronous mode is shown in FIG. 4, where a high level means that the switch is controlled to switch on, and a low level means that the switch is controlled to switch off. When an $M^{th}$ induction unit is scanned the fifth switch SW5 of an $M^{th}$ selecting assembly is controlled to switch off by the controller 102, the third switch SW3 and the fourth switch SW4 of the $M^{th}$ selecting assembly are controlled to switch on alternately by the controller 102, and the third switch SW3, the fourth switch SW4 and the fifth switch SW5 of other selecting assemblies except the $M^{th}$ selecting assembly are controlled to switch off by the controller 102.

Figure 5:
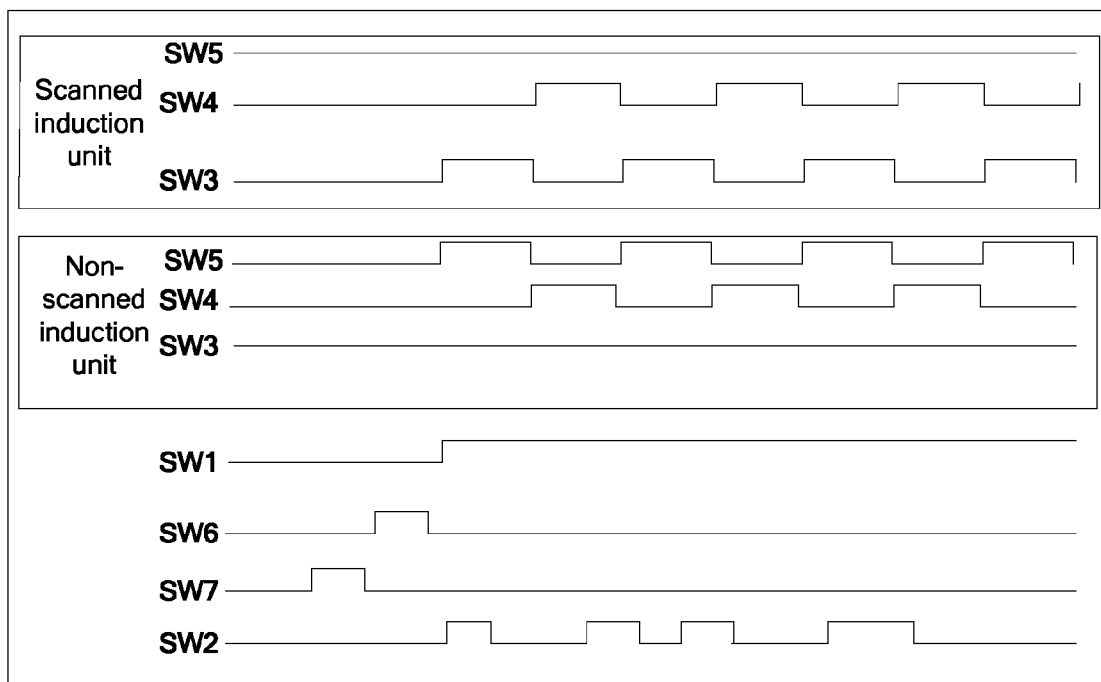
FIG. 5 is a wave chart of switch controlling signals of the capacitance detecting circuit according to another example.

In another example, a wave chart of the switch controlling signals under a fullscreen synchronous mode is shown in FIG. 5, where the high level means that the switch is controlled to switch on, and the low level means that the switch is controlled to switch off. When an $M^{th}$ induction-unit is scanned, the fifth switch SW5 of an $M^{th}$ selecting assembly is controlled to switch off by the controller 102, the third switch SW3 and the fourth switch SW4 of the $M^{th}$ selecting assembly are controlled to switch on alternately by the controller 102, the third switch SW3 of other selecting assemblies except the $M^{th}$ selecting assembly is controlled to switch off by the controller 102, and the fourth switch SW4 and the fifth switch SW5 of other selecting assemblies except the $M^{th}$ selecting assembly are controlled to switch on alternately by the controller 102. That is to say, when the $M^{th}$ induction unit is scanned under the fullscreen synchronous mode, the fifth switch SW5 of a currently scanned induction unit is controlled to switch off, while the fifth switches SW5 and the third switches SW3 of other synchronous but non-scanned induction units have a same on-off state, that is, the third switch SW3 and the fourth switch SW4 of the scanned induction unit are switched on alternatively, and the fourth switches SW4 and the fifth switches SW5 of other non-scanned induction units are switched on alternatively. In this way, when the currently scanned induction unit (i.e., the $M^{th}$ induction unit) is touched, the charges of the transferring capacitor Cmod is transferred to the capacitor (self-capacitor) Cx of the $M^{th}$ induction unit via the third switch SW3 of the $M^{th}$ selecting assembly. The capacitors Cx of the synchronous but non-scanned induction units are charged with a specified voltage via the corresponding fifth switches SW5. In the example, the specified voltage value is equal to the preset threshold voltage Vth. Therefore, the capacitance Cx of the current scanned induction unit and that of the synchronous but non-scanned induction units are charged with the preset threshold voltage Vth, and are also discharged to ground via the corresponding fourth switch SW4 to eliminate the influence of mutual capacitance, thus improving the detection accuracy.

With the capacitance detecting circuit, when detecting capacitance generated by touching the induction unit, the influence of a mutual-capacitance may be eliminated, thus improving a detection accuracy, thereby the induction unit can be judged correctly whether to be touched or not.

In addition, each function cell of the examples may be integrated in a processing module, or these cells may be separate physical entities, or two or more cells are integrated in a processing module. The integrated module may be realized in a form of hardware or in a form of software function modules. When the integrated module is realized in the form of software function module and is sold or used as a standalone product, the integrated module may be stored in a computer readable storage medium.

The storage medium mentioned above may be read-only memories, magnetic disks or CD and the like.

Although explanatory examples have been shown and described, it will be appreciated by those skilled in the art that the above examples cannot be construed to limit the disclosure and changes, alternatives and modifications can be made in the examples without departing from spirit, principles and scope of the disclosure.

What is claimed is:

1. A capacitance detecting circuit comprising:
    N induction units, where N is an integer larger than or equal to 1;
    a transferring capacitor configured to transfer charges to a capacitor of a scanned induction unit among the N induction units, wherein a first terminal of the transferring capacitor connects to the N induction units, respectively, and a second terminal of the transferring capacitor is grounded;
    a charging module configured to charge the transferring capacitor, wherein a first terminal of the charging module connects to the first terminal of the transferring capacitor, and a second terminal of the charging module connects to a first power supply;
    a discharging module configured to discharge the transferring capacitor and comprising a first resistor and a second switch, wherein a first terminal of the discharging module connects to the first terminal of the charging module and the first terminal of the transferring capacitor, respectively, and a second terminal of the discharging module is grounded;
    a controller connected to the charging module, the transferring capacitor and the discharging module, respectively, and configured to control the second switch to switch on when a voltage of the transferring capacitor is larger than a preset threshold voltage, and to update a count value and detect a touch on the N induction units according to the count value; and
    a pre-charging module configured to pre-charge the transferring capacitor, wherein a first terminal of the pre-charging module connects to the first terminal of the transferring capacitor, and a second terminal of the pre-charging module connects to the first power supply.

2. The capacitance detecting circuit of claim 1, wherein the charging module comprises a first switch and a current source connected in series.

3. The capacitance detecting circuit of claim 1, further comprising:
    N selecting assemblies, wherein each of the N selecting assemblies corresponds to one induction unit and connects between the one induction unit and the transferring capacitor.

4. The capacitance detecting circuit of claim 3, wherein the each selecting assembly comprises:
    a third switch connected between the one induction unit and the transferring capacitor, and
    a fourth switch with a first terminal connected with the one induction unit and a second terminal grounded, in which the third switch and the fourth switch are alternately switched on.

5. The capacitance detecting circuit of claim 4, wherein the each selecting assembly comprises a fifth switch, a first terminal of the fifth switch connects to the one induction unit, a second terminal of the fifth switch connects to a second power supply, and a voltage of the second power supply is the preset threshold voltage.

6. The capacitance detecting circuit of claim 1, wherein the pre-charging module comprises a sixth switch and a second resistor connected in series.

7. The capacitance detecting circuit of claim 1, further comprising:
    a pre-discharging module configured to pre-discharge the transferring capacitor before the pre-charging module pre-charges the transferring capacitor, wherein a first terminal of the pre-discharging module connects to the first terminal of the transferring capacitor, and a second terminal of the pre-discharging module is grounded.

8. The capacitance detecting circuit of claim 7, wherein the pre-discharging module comprises a seventh switch.

9. The capacitance detecting circuit of claim 1, wherein the controller comprises:
    a comparator with a first input terminal applied with the preset threshold voltage and a second input terminal connected to the first terminal of the transferring capacitor;
    a trigger with an input terminal connected to an output terminal of the comparator, and configured to generate a triggering signal according to a comparison result from the comparator;
    a counter with an input terminal connected to an output terminal of the trigger and configured to count according to the triggering signal;
    a detector connected to the counter and configured to detect the touch on the N induction units according to the count value of the counter; and
    a first selector with an input terminal connected to the output terminal of the trigger and configured to generate a first control signal according to the triggering signal, in which the first control signal is configured to control the discharging module.

10. The capacitance detecting circuit of claim 9, wherein the controller further comprises:
    a second selector with an input terminal connected with the output terminal of the comparator and configured to generate a second control signal according to the comparison result, in which the second control signal is configured to control the pre- charging module.

11. The capacitance detecting circuit of claim 9, wherein the first selector is an AND gate, a first input terminal of the AND gate connects to the output terminal of the trigger, and a second input terminal of the AND gate is applied with a switch enable signal.

12. The capacitance detecting circuit of claim 10, wherein the second selector is a NOR gate, a first input terminal of the NOR gate connects to the output terminal of the comparator, and a second input terminal of the NOR gate is applied with a pre-charging signal.

13. The capacitance detecting circuit of claim 4, wherein when an $M^{th}$ induction unit is scanned under a non-fullscreen synchronous mode, the fifth switch of an $M^{th}$ selecting assembly is controlled to switch off by the controller, the third switch and the fourth switch of the $M^{th}$ selecting assembly are controlled alternately to switch on by the controller, and the third switches, the fourth switches and the fifth switches of other selecting assemblies except the $M^{th}$ selecting assembly are controlled to switch off by the controller.

14. The capacitance detecting circuit of claim 4, wherein when an $M^{th}$ induction-unit is scanned under a fullscreen synchronous mode, the fifth switch of an $M^{th}$ selecting assembly is controlled to switch off by the controller, the third switch and the fourth switch of the $M^{th}$ selecting assembly are controlled to alternately switch on by the controller, the third switches of other selecting assemblies except the $M^{th}$ selecting assembly are controlled to switch off by the controller, and the fourth switches and the fifth switches of other selecting assemblies except the $M^{th}$ selecting assembly are controlled alternately to switch on by the controller.

15. The capacitance detecting circuit of claim 1, wherein a currently scanned induction unit is determined to be touched when the count value is smaller than a first count threshold and larger than a second count threshold.

16. The capacitance detecting circuit of claim 2, further comprising:
N selecting assemblies, wherein each of the N selecting assemblies corresponds to one induction unit and connects between the one induction unit and the transferring capacitor.

17. The capacitance detecting circuit of claim 4, wherein the each selecting assembly comprises a fifth switch, a first terminal of the fifth switch connects to the one induction unit, a second terminal of the fifth switch connects to a second power supply, and a voltage of the second power supply is the preset threshold voltage.

18. The capacitance detecting circuit of claim 16, wherein the each selecting assembly comprises:
a third switch connected between the one induction unit and the transferring capacitor, and
a fourth switch with a first terminal connected with the one induction unit and a second terminal grounded, in which the third switch and the fourth switch are alternately switched on.

19. The capacitance detecting circuit of claim 18, wherein the each selecting assembly comprises a fifth switch, a first terminal of the fifth switch connects to the one induction unit, a second terminal of the fifth switch connects to a second power supply, and a voltage of the second power supply is the preset threshold voltage.

* * * * *